(12) United States Patent
Julio

(10) Patent No.: US 8,519,830 B2
(45) Date of Patent: Aug. 27, 2013

(54) LIGHTING CONTROL ARCHITECTURE

(76) Inventor: Daniel John Julio, Boulder, CO (US)

( * ) Notice: Subject to any disclaimer, the term of this patent is extended or adjusted under 35 U.S.C. 154(b) by 479 days.

(21) Appl. No.: 12/747,870

(22) PCT Filed: Dec. 11, 2008

(86) PCT No.: PCT/US2008/086334
§ 371 (c)(1),
(2), (4) Date: Jun. 11, 2010

(87) PCT Pub. No.: WO2009/076492
PCT Pub. Date: Jun. 18, 2009

(65) Prior Publication Data
US 2010/0277340 A1  Nov. 4, 2010

Related U.S. Application Data

(60) Provisional application No. 61/013,350, filed on Dec. 13, 2007.

(51) Int. Cl.
*G05B 11/01* (2006.01)
*G08C 19/16* (2006.01)

(52) U.S. Cl.
USPC .................................. 340/12.22; 340/12.3

(58) Field of Classification Search
USPC .............. 315/291, 307, 308, 312; 345/564, 345/536, 537, 538, 549, 556, 565; 340/4.61, 340/340/4.26, 5.22, 5.23, 5.64, 5.8, 12.22, 340/12.28, 12.3, 12.31, 12.32
See application file for complete search history.

(56) References Cited

U.S. PATENT DOCUMENTS

| 6,188,181 B1 * | 2/2001 | Sinha et al. .................... 315/293 |
| 6,969,954 B2 * | 11/2005 | Lys .............................. 315/155 |
| 7,161,556 B2 * | 1/2007 | Morgan et al. .................. 345/1.1 |
| 2004/0198413 A1 * | 10/2004 | Smith et al. ................ 455/550.1 |

FOREIGN PATENT DOCUMENTS

| JP | 2000-166162 | 6/2000 |
| JP | 2001-351788 A | 12/2001 |
| KR | 10-2005-0077825 | 5/2006 |

* cited by examiner

*Primary Examiner* — Minh D A
(74) *Attorney, Agent, or Firm* — Patent Law Office of Rick Martin, PC

(57) ABSTRACT

A system and method of lighting protocol and architecture to control lighting parameters, consisting of an X-byte data packet with command, addressing, Hue, Saturation, and Intensity selection, and fading control whereby commands set a remote device state with no need for a constant stream of data, each fixture computing its own parameters. Management of a lighting fixture is done with its own local controller having light management thus eliminating the need for the central controller to handle a magnitude of lighting fixtures. The central controller sending only commands for state changes, eliminating the need for continuous computation and command transmission to all fixtures within its realm. The remote controller manages transitions from one state to another after a command.

24 Claims, 6 Drawing Sheets

LIGHTING CONTROL ARCHITECTURE

CROSS REFERENCE APPLICATIONS

This application claims the benefits of provisional application No. 61/013,350 filed Dec. 13, 2007 and PCT application no. PCT/US2008/086334 filed on Dec. 11, 2008.

FIELD OF INVENTION

The present invention relates to a system and method of lighting protocol and architecture to control lighting parameters. More specifically, it consists of a compact data format of X-bytes having a specific format whereby specific bytes would contain commands, lighting addressing information, parameter control information such as Hue, Saturation, and Intensity, fading control over a select period of time, etc. The method also including the management of a lighting fixture having its own local controller with state management. The method including increased Pulse Width Modulation Resolution whereby color control of LED output intensity and color level is controlled via 7-bit computational load resulting in equivalent 8-bit resolution to the human eye.

BACKGROUND

Current lighting systems generally use one of two methods to control multiple lights in a coordinated fashion. They are:

Centralized control: A central controller keeps track of the intensity of each light it is controlling and directly controls the intensity of lights. For example a DMX controller constantly outputs the intensity to the lights it controls. The controller directly computes new intensity values based on the user's requirements. Other systems keep local copies of the intensity of each light they control and update that copy when they send commands to remote light fixtures to change intensity.

Stateless distributed control: Some low-cost systems (for example X10) do not keep track of the intensity at all, they are considered 'stateless' in that there is no central control knowledge of a fixture's current state. They send commands such as "increase brightness", "decrease brightness", "turn light on at full intensity" or "turn light off" to remote lights. These systems count on the inherent feedback through the user. The user presses a button to increase the intensity of a light and releases the button when he/she observes the light at an acceptable intensity.

A function of lighting control systems is scene management. Scene management allows various pleasing combinations of lights to be stored and set on command (for example lighting in a home theatre may have scenes for use of the room as a playroom and use of the room to watch a movie). Effective scene management requires that a controller (at some location) keep track of current light fixture attributes so that it can transition lights from one scene to another. For white lighting these attributes are usually just the intensity. Color capable lights require additional information. Scene management is difficult to do reliably with stateless distributed control.

Centralized control becomes expensive for large numbers of light fixtures and for installations that want multiple control devices, for example multiple switch plates (switch panels) or different control systems such as a switch plate, a remote (wired or wireless) control and a computer control. A central controller controlling a large number of lights must have the compute ability and communication bandwidth to simultaneously control all lights involved in a scene transition. A system employing multiple system controllers must keep a synchronized record of the state of all lights in all controllers. Either there is a central "database" of the state that all controllers access whenever they update light state, or each controller must broadcast changes it makes to the state of the lights to all other controllers. U.S. Pat. No. 6,160,359 dated Jan. 30, 1998 to Fleischmann teaches a lighting control apparatus that allows a lighting load to be controlled. The apparatus includes an input device and a means for generating a lighting control request in response to the input device. The lighting control request indicates an identifier and a lighting state for the lighting load. The apparatus further includes a circuit for connecting to a remote computer. The generating means sends the lighting control request to the remote computer via the circuit. The remote computer controls power to the lighting load according to the lighting control request. U.S. Pat. No. 5,191,265 dated Aug. 9, 1991 to D'Aleo et. al teaches a fully modular lighting control system wherein several possible lighting scenes are user defined and stored in the lighting control system for recall by the user upon depression of a selected one of a plurality of scene select buttons.

This problem is exacerbated with color-capable lights. Changing intensity of a white light is a 2-dimensional problem. The intensity is varied over time. The controller takes the period of time the light is to be changed over and changes the intensity in small increments at a rate sufficient to make the change look animated (for example a change in brightness may occur over a 1 second period. The controller might change the intensity $\frac{1}{30}^{th}$ of the requested amount 30 times over the second for a smooth fade). Changing intensity of a color-capable light is usually a 4-dimensional problem. Color components (for example, red-green-blue or hue-saturation-value) are varied over time. The computational, data storage and communication bandwidth loads are higher for each light.

Color-capable lights are controlled through a color model. One color model that is more intuitive than most is the Hue-Saturation-Value (HSV) model or sometimes known as the Hue-Saturation-Intensity (HSI) model. It is a three-dimensional color model. One axis controls the color's hue (or actual color value). The hue is generally the single word that we would use to describe a 'composite' color. A second axis controls the color's saturation. Saturation specifies how pure the color is. A fully saturated color has no white component in it. White is the unsaturated value. A pure red is fully saturated. Pink is a less saturated red. The third axis controls the intensity of the light. The hue, saturation and brightness of a light beam are often specified using a three-dimensional HSV or HSI color tree, as shown in FIG. 1. The color tree shown represents one horizontal slice of the total color spectrum represented by a cylinder.

The vertical axis 10 of the tree specifies the intensity (lightness) of the beam, from nothing at the bottom (that is, black 12) through gray 14 to some maximum value 16 at the top corresponding to the brightest possible white. At each level of the tree (which corresponds to a given lightness or brightness), we draw a hue circle 18 whose circumference shows the various pure, fully saturated, monochromatic colors of the rainbow in wavelength order from red to violet. The shown Hue circle 18 represents but one slice of a cylinder going from black 12 at the bottom to the maximum value 16 or brightest value at the top. The points on a radius line from the center of the tree to some point on the circumference represent saturation via different unsaturated colors formed by mixing some amount of white from the center of the tree with some amount of the color at the end point of the line. These color models are implemented in many computer systems for use by graphic artists when modifying images. As shown in FIG. 1, pink is a mixture of red and white, and the hue of the mixture is still red. Mixtures of yellow and white would produce colors that we would still call yellow, but which also might be described as "cream" white, "warm" white, etc.

Color-capable light fixtures are primarily used for decorative purposes. Systems involving color-capable light fixtures often use many more of these fixtures than an illumination system comprised of white lights because the most attractive scenes involve multiple colors. Although commercial systems can absorb the cost of a complex controller, residential systems need an architecture that can be implemented in a low cost way.

Disparate intelligent electronic devices that need to communicate with each other use a set of rules governing communication between them called a protocol. Protocols specify how data is organized, what the data means and how it is communicated. Protocols allow different kinds of devices, often from different manufacturers, to interact. Protocols are often described in terms of layers. Layers describe certain, related attributes of a protocol. Layers typically start at the lowest level in describing a protocol and move progressively to higher level descriptions.

The lowest level of a protocol is often called the physical layer, which describes the actual physical mechanism by which data is transferred from one device to another. Physical mechanisms can include wired serial interfaces (such as RS232 or USB), infrared light/laser communication, or radio-frequency interfaces. The physical layer is only concerned with moving data bits between devices. Its description does not need to include the meaning of any of the bits or even that they are reliably delivered (for example, data lost through a weak RF connection).

The next level of a protocol is often called the link layer. It assembles the data to be transmitted and adds any necessary information for correct operation of the link layer. For example a RF interface requires many additional bits to make sure a receiver can correctly identify a radio packet. The link layer often is responsible for making sure data is correctly sent between endpoints by adding correction bits (for example to allow a receiver to reconstruct part of a lost packet) or the ability to retransmit lost information.

Layers above the link layer depend on the complexity of the protocol. Often there is only an application level that is responsible for the actual format of the data. The application layer takes requests from one device's control program and gets them sent to another device (or conversely takes data from a communication interface and gives them to the control program). Complex communication protocols used to connect hosts to the Internet may be implemented in many more layers. One example is Transmission Control Protocol/Internet Protocol (TCP/IP), which is used to transmit data over the Internet and local computer networks. The 'IP' is responsible for moving packet of data from node to node. The TCP is responsible for verifying the correct delivery of data from client to server.

For the lighting industry the simplest protocol is a simple on/off switch. Electricity either flows or does not flow through a light bulb. The marriage of computers and lighting has vastly increased the capability to control lighting (for example, scene management) but requires more complex protocols. Traditionally protocols have been designed to handle two attributes, dimming and addressing. Dimming allows a controller to send an intensity value to a light. Addressing allows the controller to control a particular light or a particular group of lights in a larger number of controlled lights. Together these attributes allow control of traditional white lighting.

There are many existing commercial products providing computer control over lighting implementing many protocols. There are proprietary protocols that only interoperate between devices made by one manufacturer (for example, Lightolier® Controls). There are licensable protocols designed to allow devices from many manufacturers to work together (for example X10, Insteon™, Z-wave® and UPB for the home, DMX-512, Lon and DALI for commercial automation). The protocols operate a variety of physical interfaces. The most common physical interfaces for home devices are encoding signals on the power line or through RF interfaces. These two methods make installation of devices very easy because there is no additional wiring.

The recent introduction of color capable light fixtures has added additional complexity to the control problem. The most common way of controlling color capable light fixtures is through the industry standard DMX-512 protocol. The DMX-512 protocol has its origins in theatre lighting. It is a digital technology that replaced analog signaling (that required a separate cable per light fixture) with a digital interface that can be daisy chained between light fixtures. The protocol is fairly simple (although recent additions, not so widely used, have increased the complexity). It is based around the concept of a central controller (traditionally a theatre's lighting desk) that controls many lights. The protocol is physically implemented as a serial bit stream transmitted on industry standard RS-485 interface at 250 k-Baud. It consists of up to 512 data bytes that are constantly repeated. Each byte controls one channel (traditionally a single light fixture's intensity). Changing the value of a byte changes the associated light's intensity. Traditionally each light had a set of addressing switches that told the light what byte in the stream it should associate with. The panel operator had to remember, for example, that channel 23 was associated with a particular light. Computers have simplified management. The DMX protocol uses special cable and robust connectors and is well suited to the harsh theater and stage environment.

While suited for commercial application DMX is not well suited for residential use. It requires expensive cabling. Color capable light fixtures require many channels to control their component colors, and there is no standardization of color to channel assignment. This makes configuration and control very difficult. DMX controllers have typically been expensive.

There are also some proprietary protocols for controlling color-capable lights. To date they are focused on very specific problems such as delivering video streams to "walls of light" or control within a light fixture.

To be successful in a residential application a lighting control protocol should have several key attributes.

Ease of installation: The physical layer should not depend on expensive cabling. The protocol should work on inexpensive interfaces such as low-speed packet radio.

Fixture independence: The protocol should be able to control fixtures from different manufacturers without having special fixture-specific attributes. Color should be specified in a way to allow fixtures to compute their own color components.

Wide compatibility: The protocol should enable support of existing white lights.

Addressability: The protocol should allow individual lights and groups of related lights to be controlled.

Low-cost: The protocol should allow low-cost implementations. It needs to work with very simple (inexpensive) micro-controllers. It cannot require a constant stream of data or complex overhead.

As applied to lighting control, Pulse Width Modulation (PWM) is a technique to digitally (only 1's and 0's) control light intensity. It works by varying the time a digital signal is on within a period. This period is repeated many times per second. The average value of the signals "on" time determines the value of the control signal. PWM is an old technique and has a wide variety of applications including power-supplies, motor and servomotor control, communication devices, class-D audio amplification and light intensity control.

Pulse Width Modulation is commonly applied to controlling the intensity of LED lights. The pulses are repeated at rates of 60 Hz to 50 kHz (the period). Human persistence of vision allows the eye to average these pulses into a solid color. Too long of a period and the eye senses flicker in the generated light. The width of each pulse controls the intensity of the light. A typical color-controlled light fixture has three PWM channels, one for each of the primary additive light colors: red, green and blue. Varying the intensity of each of the primary colors creates different colors.

FIG. 2 (prior art) shows the number of different pulse-widths in one period of time 110 specifies the resolution of control over the intensity. For example a period that can be divided into 256 different pulse-widths provides 256 different intensity levels. Shown are example periods with various amounts of 'on' time within the period, low period 112, medium period 114 and high period 116 having a low, medium or high intensity level. The value of 256 is common since it can be represented as the number 0-255 in an 8-bit byte. A system with 256 intensity levels is said to have 8-bit resolution. Generally it is better to have higher resolution control in color lighting systems.

The pulses may be generated in a variety of ways. Typically they are generated using dedicated logic circuits. They could be under the control of software running on an embedded microprocessor/micro-controller. Use of a micro-controller is often the most cost-effective method. Unfortunately low-cost micro-controllers are often limited in the number of computations they can perform each second. This limits their ability to generate high-resolution PWM signals with a reasonable period. Pulse Width Modulation is usually implemented in a micro-controller by setting a component in the micro-controller called a timer to generate a periodic signal. This signal is used as an interrupt source in the micro-controller. Interrupts cause the micro-controller to stop executing the current code and immediately begin executing a special piece of code called an Interrupt Service Routine (ISR). The micro-controller can manage real-time activities (such as generating the regular PWM signals) using interrupts. The period between interrupts is the shortest pulse width. In this way the ISR can look at a set of counter variables and determine when to switch on and off the signal for each channel.

For example consider a system with 8-bit Red, Green and Blue output channels generating an orange-green color. This color may be generated with 33% red, 66% green and 0% blue. These percentage values would be specified as 84 for red (33% of 255), 168 for green (66% of 255) and 0 for blue. These values are loaded into variables in the micro-controller. The micro-controller also has an 8-bit counter that counts from 0 to 255 for each PWM period. The counter is incremented in the ISR along with code that compares its value with the color variables. As long as the counter is less than the value in the color variable then the micro-controller sets the signal associated with each color to a logical 1 value (turns the associated LED on). When the counter is equal to or greater than the color variable then the micro-controller turns the signal off. In this example the red signal would be on approximately 33% of the time of each period, the green on approximately 66% of the time and the blue signal would never be turned on.

The micro-controller is usually processing other tasks in addition to generating the PWM signals. For example receiving commands from an external controller or executing the code to compute color values used in a fade between two colors. These other tasks are handled in the code that is interrupted by the timer. The PWM signal generation is handled in the ISR since it must have "real-time" response (to prevent varying intensity in the LEDs). When the ISR is done processing for one pulse interval in the PWM period the micro-controller is free to perform the other tasks. Software engineers attempt to optimize the code in the ISR to take the least amount of time possible (least number of machine instructions). The amount of time the ISR takes to execute determines the maximum performance of the PWM. The amount of time the ISR takes to execute plus overhead allowed for other task execution determines the practical performance of the PWM in a particular micro-controller running at a particular clock rate.

Each additional bit of resolution requires double the number of interrupts. Consider two PWM implementations with 7-bit and 8-bit resolution and a PWM period of 10 mSec (100 PWM periods per second). The PWM with 7-bit resolution breaks each 10 mSec period into 128 intervals and requires 128×100=12,800 interrupts per second. The PWM with 8-bit resolution breaks each 10 mSec period into 256 intervals and requires 256×100=25,600 interrupts per second. Although the 8-bit resolution PWM provides much finer control of light intensity it also requires significantly more processing.

There are other complicating factors in real systems that make actual PWM implementations more complex. LED lights do not exhibit a linear increase in intensity with linear increases in PWM control. PWM implementations often have variable pulse widths to account for this. These increase the computational load in the micro-controller even further.

What is needed is a system architecture that allows a low cost architecture providing lighting control without requiring central state management, having ease of installation, fixture independence and wide compatibility. The present invention resolves these problems as will be described herein with distributed lighting control architecture.

SUMMARY

The primary aspect of the present invention is to provide a low cost architecture providing distributed lighting control, that is, the central controller does not need to know the 'state' of any light under its control.

Another aspect of the present invention is to address ease of installation by supporting a variety of interfaces between controllers and light fixtures.

Yet another aspect of the present invention is to provide for fixture independence, that is, the central controller does not need to know how any fixture it controls generates different colors or even dimmable white light.

Another aspect of the present invention is the ability to send commands only when necessary without continuous updating required.

Yet another aspect of the present invention is to provide an addressability of remote light fixtures for any combination of complete installations of lights, groups of lights within an installation or individual light fixtures.

Still another aspect of the present invention is to provide for compatibility to any light fixture, including existing 'white' lights.

Still a further aspect of the present invention is to free up micro-controller utilization in calculating PWM.

Another aspect of the present invention is for co-existence of multiple controllers in various technologies and locations.

Other aspects of this invention will appear from the following description and appended claims, reference being made to the accompanying drawings forming a part of this specification wherein like reference characters designate corresponding parts in the several views.

The present invention is a system and method for a color capable lighting control system comprising:
- an architecture with a protocol to provide central control of lighting fixtures via a central controller (processor) communicating with a plurality of remote lighting controllers;
- whereby fixture independence is achieved in that the central controller does not need to know the 'state' or 'technology' of any color-capable light regarding color capability, or white light fixtures;
- the architecture sending commands in a send and forget mode (i.e. continuous updates are not required);
- said architecture providing an addressability of remote fixtures for any combination of installations, groups within an installation or individual fixtures within the installation; and
- said architecture implementing software in a 7-bit resolution to free up micro-controller utilization in calculating PWM but providing the capability of 8-bit resolution.

A distributed color capable lighting control system comprising:
- a plurality of color capable light units each unit having a remote controller with a data packet receiver and a unique address including a user selectable group identifier;
- said remote controller independently controlling the hue, saturation, intensity, fade time and dwell time of its light unit based on the data contained in its data packet receiver;
- a programmable central lighting system controller generating a data packet and communicating said data packet to the data packet receivers of the plurality of remote controllers in a send and forget mode; and
- wherein each remote controller maintains its light at a steady state until a new data packet is received.

Figure 1:
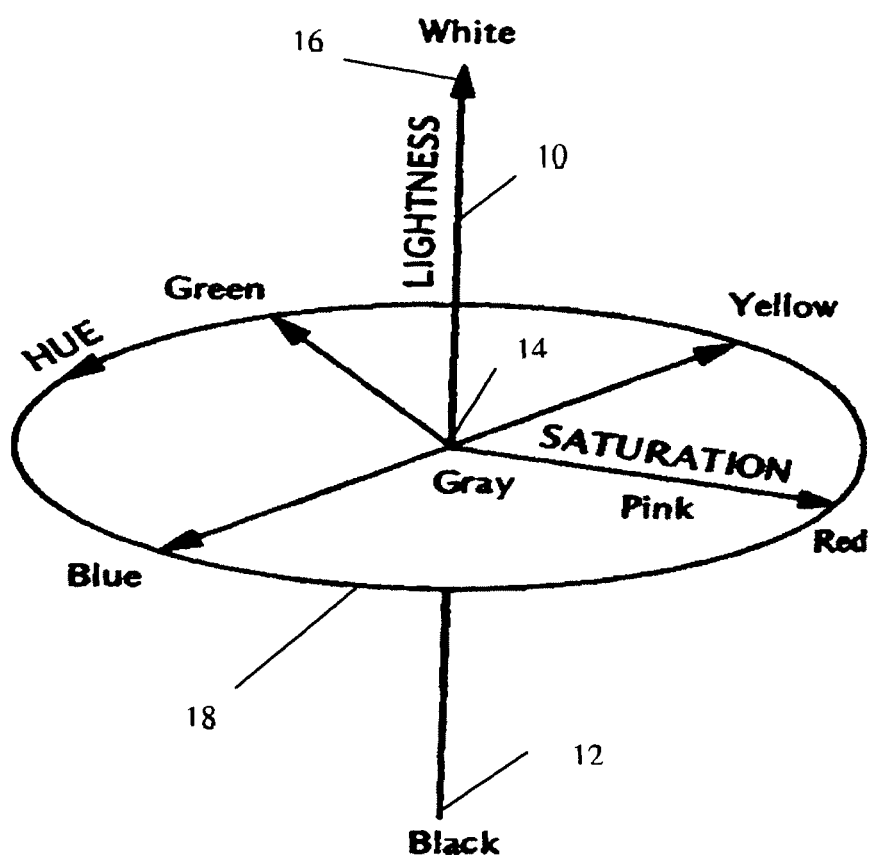
FIG. 1 (prior art) is a three-dimensional color space showing Hue, Saturation and Lightness (Intensity).
Figure 2:
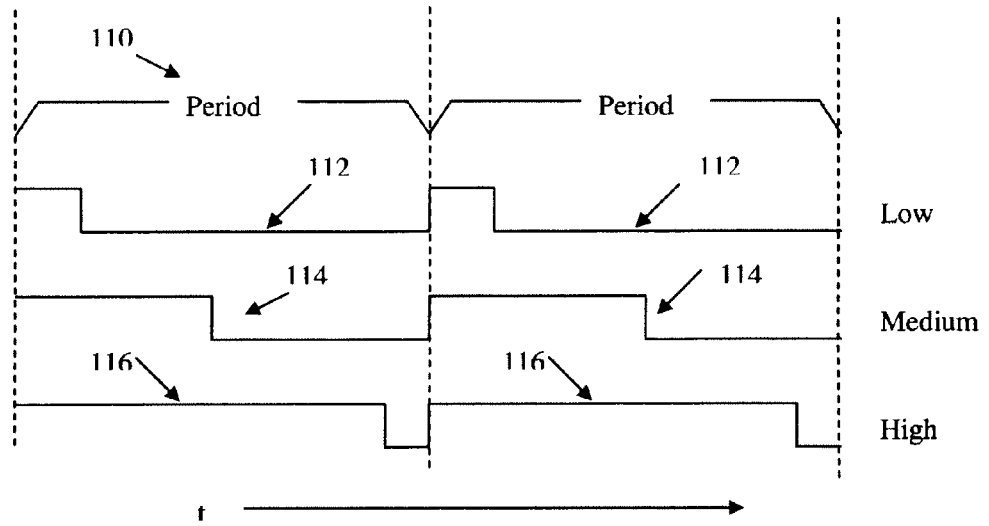
FIG. 2 (prior art) is a time period diagram of prior art showing a time period with 256 different possible intensity levels.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION

The present invention provides three main features; fixture independent lighting protocol, distributed lighting control architecture that pushes knowledge close to the actual light fixture.

A. Fixture Independent Lighting Protocol

The invention provides lighting control protocol designed for residential use and suitable for use in commercial applications as well. It will be described with one specific implementation for the preferred embodiment but the concepts apply to many different types of implementations. It has the following attributes:
Simple Compact Data Format
Sophisticated Addressing Mechanism
Independent Color and Intensity Specification
Support for a variety of physical interfaces
Set and Forget Distributed Architecture
Fading Control and Scene Management
Extendibility
Simple Compact Data Format In the preferred embodiment implementation the application level data is contained in packets with a maximum size of 16-bytes (Ref FIG. 3). The packets have a specific format. The first byte indicates the type of packet and may contain the initial (or only) part of a command. Subsequent bytes indicate addressing and contain command data. The format allows for simple decode software. It is extensible to allow additional commands and types of devices to be controlled in the future. The small packet size allows for efficient data transfer over a variety of physical interfaces and at a variety of data rates. It should be noted that although the preferred embodiment of the present invention uses a 16-Byte packet format, it can easily be redefined with more (or less) Bytes.

Sophisticated Addressing Mechanism

The protocol supports a sophisticated addressing mechanism capable of controlling millions of light fixtures. The address mechanism provides the capability to easily address individual lights, groups of related lights or entire installations of lights with a single command. The protocol supports the concept that groups of lights may be related. For example consider a set of wall sconces or a set of garden lights. It may be desirable to turn them all on or off with a single command. It may also be desirable to control each individually (for example to set different colors). It may also be desirable to control sub-sets with the same command (for example to paint an attractive complementary color pattern on a wall by addressing all even sconces with one color and all odd sconces with another color).

The protocol implements the addressing mechanism with the concept of zones, groups and units. A zone is a group of related light fixtures. The relation is arbitrary. It may be the set of sconces in the previous example or a set of lights in a single physical light fixture (such as a chandelier). A group is a collection of lights within a zone. Each light may belong to zero or more groups according to arbitrary conventions. Group numbers are unique within a zone. In the previous example, all even sconces may belong to group 1 and all odd sconces may belong to group 2. Furthermore other combinations may belong to other groups, for example the first and last may belong to group 3 and all middle sconces may belong to group 4. The concept of groups within a zone allows easy scene management. A single command may target a particular group of lights, leaving all other lights unaffected. Finally each light has a unique unit address within the zone to allow for control of a single light.

The protocol transmits addresses in two formats that are understood by all receiving devices: Group and Unit. Group addresses consist of a zone address and a Group address. Unit addresses consist of a zone address and Unit address. The special value of '0' for an address makes that address a wildcard. A wildcard address matches all possible address for that component of the address. This mechanism gives the addressing mechanism great flexibility. The following types of light selection are easily made.

- All units: Setting the Zone Address=0 and either the Group or Unit Address=0 will address all possible lights.
- Entire Zone: Setting the Zone Address to a specific zone number and either the Group or Unit Address=0 will address all lights within a zone.
- Zone Group: Setting the Zone Address to a specific zone number and the Group Address to a specific group will address all lights within that zone that are part of that group.
- Zone Unit: Setting the Zone Address to a specific zone number and the Unit Address to a specific unit within that zone will address a single light.
- Multiple Zone Group: Setting the Zone Address to 0 and the Group Address to a specific group shared by multiple zones will address all lights that are part of that group.
- Multiple Zone Unit: Setting the Zone Address to 0 and the Unit Address to a specific unit will address all lights with that unit in any zone.

The preferred embodiment implementation provides the following limits:

- Zone Address—16 bits
- Group Address—8 bits
- Unit Address—16 bits
- Number of Groups per light fixture—at least 4
- Independent Color and Intensity Specification The protocol supports an independent color and intensity specification using the HSV color space. The protocol transmits three values, Hue, Saturation and Value (Intensity) along with a set of control flags specifying how the HSV values should be used in commands to set a color or fade to a color.

Use of the HSV color space allows for a single command to control multiple disparate light fixtures. For example a color-capable light fixture can calculate and generate the correct color using the Hue and Saturation components while a white light fixture can just use the Value component to set its intensity. Each color-capable light can calculate device specific colors, for example a light fixture using only RGB LEDs can convert the HSV to 3 color channels while a light fixture using additional colored LEDs for better color generation can convert the HSV to specific channel information it needs.

Each of the components, Hue, Saturation and Value, have additional information flags associated with them. The flags allow a controller to issue commands changing only a part of the color or intensity. For example the controller can setup different intensities and saturation levels for a number of light fixtures and then modify only the hue (basic color). The Value field also has a Scaled Flag. The Scaled Flag specifies that the command's Value should be used to scale the current light fixture's Value (intensity). This implements a master intensity control that can adjust the intensity level of a number of light fixtures based on their current brightness. The Value field also has a DeltaValues Flag. The DeltaValues Flag specifies that the command's Value should be added or subtracted from the current value. This allows for sending relative value changes, for example a command to increase the current brightness by 10% or to decrease the current brightness by 10%.

The preferred embodiment implementation specifies color and intensity as follows:

- 11-bit Hue specification
- 9-bit Saturation specification
- 9-bit Intensity specification
- 5-bit Flags: Enable Hue, Enable Saturation, Enable Intensity, Scale Intensity, Delta Values Direct channel control allows a control device to directly control one channel of a light fixture for specific applications that may be outside the range of standard features in a lighting control system.

Support for a Variety of Physical Interfaces

The packet nature of the protocol, Set and Forget Architecture, Addressing methods and efficient color control reduce the bandwidth requirements allowing implementation on a variety of wired or wireless physical interfaces. For this patent wireless includes radio, infrared, cell phone etc. Examples of each include but are not limited to interfaces such as:

- Wired interfaces such as RS-232, RS-485 and USB, power-line modulated signals;
- Wireless interfaces including proprietary wireless protocols or mapped to existing wireless protocols;
- Infrared communication such as a handheld remote control Set and Forget Distributed Architecture The protocol implements a 'set and forget' architecture. Commands set state in a remote control devices and do not need a constant stream of data to operate. In this patent the term 'maintaining' a remote controller implies maintaining the last state including transitions between states or preprogrammed instructions imbedded in the remote controller. In this manner a central controller does not need to know the details of individual fixture control nor does it have to continuously update remote controllers. For example a fade command requires one packet and causes each light fixture to compute its own fade. Thus, unlike a DMX controller that sends a constant transmission of data, the transmission of data in the present invention is very efficient.

Fading Control and Scene Management

The protocol supports a fade command that causes the selected light fixtures to change to a new color over a specified period of time. The fade command enables sophisticated scene management with little overhead. In the preferred embodiment implementation the fade command provides a 16-bit fade period that specifies the fade in units of one-tenth second.

Extensible

The protocol allows for additional device types and commands to be added later.

In the preferred embodiment implementation the device type is encoded in a 4-bit field. Four values are used; one value to specify a command for a light fixture; a second value for device-specific commands; a third value for configuring any device type; and a fourth value to specify a response data packet from a remote device to a controller. The architecture allows for reserved device types to be allocated in the future.

B. Distributed Lighting Control Architecture

The invention is a distributed architecture that pushes knowledge of the light's current state (intensity, color or other attributes) as close to the actual light fixture as possible and also puts the responsibility for light management (color control, fading) in the same remote light fixture controller. This reduces cost of the controllers by eliminating the need for a controller to maintain state of all lights under its control. It simplifies control of lights by multiple controllers by eliminating the need for controllers to share or coordinate light state. It allows for reliable scene management at a cost approaching stateless distributed systems.

The light fixture controller (LFC) (ref FIG. 4A Light Fixture Controller 3400) has two primary functions relating to this invention:

State Maintenance: The current state (such as intensity, color or other attributes) is stored in each LFC. Central controllers send commands to the light fixture to cause it to change state. Since the light fixture LFC maintains its own state it can transition appropriately to the new state without intervention of the central controller. The light fixture LFC will keep the light at its present state until a new data packet is received requiring a change from present state. The central controller can send a command and "forget" about the light. It does not need to compute new state or continue to transmit commands to effect a change to the new state. Multiple controllers can send commands without regard to a state sent by another controller. The LFC manages all incoming commands in an appropriate fashion to its own requirements.

Color Control: The LFC manages transitions from one state to another. Some commands instruct the LFC to smoothly transition from one state to another over a period of time (a fade command). The central controller does not need to understand any specifics about a particular light fixture in order to cause a fade. It does not need to understand the current light fixture state. It only needs to send a fade command with the desired final state to the LFC for a specific light fixture. The LFC implements whatever algorithm is necessary to effect the state change.

In addition the central controller does not even need to know about any specific light fixture it is controlling. Addressing methods within the control protocol will cause desired lights to respond.

The invention applies a modified form of Bresenham's line drawing algorithm to color fading. Bresenham's algorithm, originally developed to compute the coordinate information needed for computer plotters to draw lines, determines which points in an n-dimensional raster should be plotted in order to form a close approximation to a straight line between two given points. Although line drawing algorithms are simple, Bresenham's algorithm is important because it uses only integer addition, subtraction and bit shifting all of which are very cheap operations in standard computer architectures and well suited for inexpensive micro-controllers.

Originally, for computer graphics, Bresenham's algorithm was applied to two dimensions, X and Y. It works by determining a major axis and a minor axis and computing a set of constants that can be used in a simple evaluation loop to generate new values. In terms of computer graphics the major axis is the axis that has the greatest change.

The present invention applies a variant of Bresenham's algorithm to four dimensions, Hue, Saturation, Value and Time. The algorithm, implemented per light, calculates interim color values during a fade command from the current color state to a new color state given by a fade command. The effect is to cause the light fixture to fade across the HSV color space from one color to the next. The algorithm is implemented so that it breaks the fade down into small intervals so that the color change appears smooth to a human observer. A typical value for the interval may be 10 mSec so there are 100 color changes per second. The algorithm computes the appropriate values of HSV at each time interval and causes the light to reflect these interim values. The algorithm terminates when the interim value reaches the final value specified by the fade command.

Multi-dimensional variants of Bresenham's algorithm have been used in the computer graphics field for many years. The present invention is unique in that one axis of the algorithm is time. The algorithm is being used to vary a value over time and not just space.

The algorithm can be applied to any color space representation. The invention applies the algorithm to a HSV color space but it could also be applied to a RGB or CMYK color space. It is not limited in the number of axis.

C. Increased Pulse Width Modulation (PWM) Using Temporal Averaging

This invention makes use of the eye's ability to average the pulsed LED output into a single intensity. It allows an apparent doubling of intensity levels for the same computational load. As implemented in the preferred embodiment of the present invention, it allows an 8-bit resolution for essentially the computational load as a 7-bit resolution. However the invention may be applied to any PWM implementation.

The invention works by changing the pulse width every period. The human eye averages the PWM periods together into a single intensity. Alternating two different pulse widths will cause an apparent intensity that is the average of the two pulse widths.

This technique may be illustrated using the present invention's specific implementation. The present invention implements a PWM with a period of 10 mSec and a timer programmed to interrupt the micro-controller 128 times per period (12,800 times/second). However the color specification registers are 8-bit to allow an 8-bit color resolution. The method of the present invention divides the 8-bit color by two with a result of N plus a 1-bit fraction for use in consecutive Interrupt Service Routine periods, which each form the shortest pulse width. One period having a value of N for 'on' time, the other having a value of N+1 for 'on' time (if the 1-bit fraction were present, otherwise the value of N is used). The divisible result is used as control for the PWM for one period with the next period using the additional 1-bit fractional value, if any. When converted from binary arithmetic the 1-bit fraction represents the value of 0.5. For example the 8-bit number 255 divided by 2 results in a binary value of 1111111.1 or 127.5. In the example shown in Table 1, the 8-bit binary number 85 is represented.

TABLE 1

| | |
|---|---|
| 8-bit color value = 85 | 01010101 |
| 7-bit result w divide by 2 | 0101010 plus 1 bit fraction |

With a divide by two (easily done via a shift right one bit), the even period would have a value of 0101010 and the odd period (next sequential period) would have a value of 0101011. The 7-bit result is thus used as the control value for the PWM. The control signal is on whenever the micro-controllers PWM counter is less than this value and off whenever it is equal to or greater. The 1-bit fraction value is used to modify this value every other period. In even periods the PWM is controlled by the 7-bit value directly. In odd periods the 7-bit value is incremented by 1 before the comparison with the counter if the 1-bit fraction is set. The idea is that a set 1-bit fraction indicates a fractional value of 0.5. Fractional numbers greater than 0.5 are rounded up to the next higher integer value. The even period has a pulse length of N where N=int(Color Value/2) or the Color Value divided by 2 and the 1-bit fraction discarded. The even period has a pulse length of either N (if the 1-bit fraction=0) or N+1 (if the 1-bit fraction=1). The eye will average these two pulses into a value of N+0.5 in the case the 1-bit fraction is set.

Since the averaging is done over consecutive PWM periods the algorithm is said to be temporal. The temporal averaging of the present invention requires very little computational overhead. The division by 2 is handled by a rotate right instruction that most micro-controllers have. The 1-bit fraction comparison can be quickly made since the rotate right instruction usually rotates the low bit into a special CARRY bit. Other coding decisions can also reduce the computational overhead.

Figure 3:
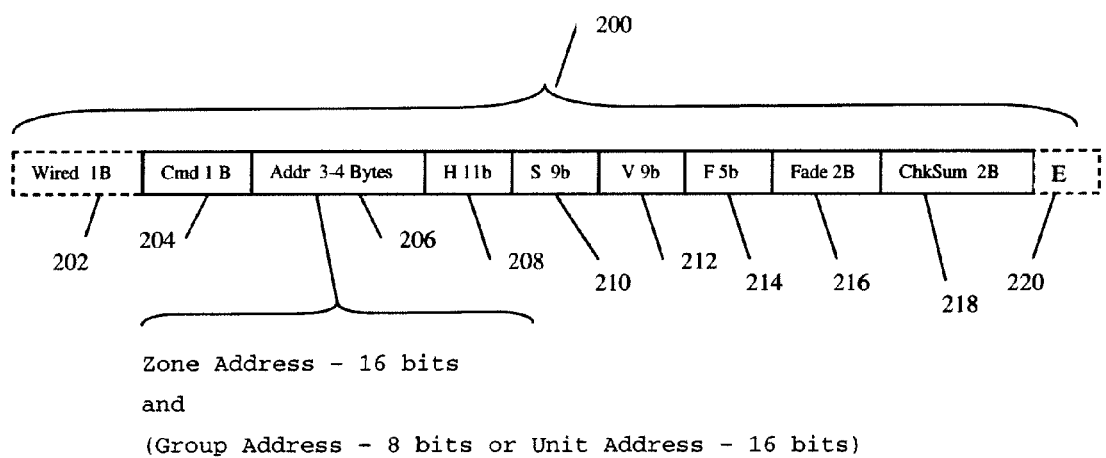
FIG. 3 is a schematic representation of the transmitted packet structure of the preferred embodiment of the present invention.

FIG. 3 is a schematic representation of the transmitted packet structure 200 of the preferred embodiment of the present invention. In the preferred embodiment the maximum size of a transmitted packet is 16 Bytes, each Byte having 8 bits. If the central controller is hard wired, then a first byte 202 is a 'start of packet' byte. The command byte 204 is extendable to 256 combinations allowing addition of future commands. It contains commands such as:

Set HSV color group address
Set HSV color unit address
Fade HSV color group address
Fade HSV color unit address It could also present a query command to a remote lighting controller asking for the present color of remote units.

Three or four address bytes 206 control addressing schemes for zone, groups and individual fixtures. The first two bytes of address bytes are zone bytes. Decoding of the address field is performed by the receiving device (remote lighting controller). The following are some examples of addressing schemes:

If the first two bytes are 'zero' (a wildcard) then all zones will apply. If the group or unit address, depending on the command byte 204, is also zero then 'all' lights will apply. Else, the third byte is decoded by the receiving device as a 'group' or the third/fourth bytes are decoded as a 'unit', depending on command byte 204.

If the first two bytes are 'non-zero' then a specific zone number is addressed. Then the 'group' (byte 3) or 'unit' (byte 3 and 4) address, depending on command byte 204, is decoded to address all lights in a group or an individual light. Setting the zone address to a specific zone number and either the 'group' or 'unit' address to zero will address all lights within the zone.

Color is specified with an 11-bit Hue field 208, a 9-bit Saturation field 210, a 9-bit Intensity field 212 and a 5-bit flag field 214. The 5-bit flag field 214 allows the central controller to issue commands changing only part of the color or intensity. For example the controller can set up different intensities and/or saturation levels for a number of light fixtures and then modify only the hue. The preferred embodiment of the present invention utilizes the 5-bit flag field 214 for:

Enable Hue
Enable Saturation
Enable Intensity
Scale Intensity (allows a master control to adjust the intensity level of light fixtures, as a percentage of their current brightness)
Delta Values (allows a master controller to change the current value by a delta amount)

2-Byte field 216 is used to specify the 'fade time' value for Fade commands. Fade time can be controlled in 0.1 second increments. This allows a fade command to cause selected light fixtures to change to a new color over a specified period of time. Finally a 2-Byte checksum field 218 ensures data integrity. It should be noted that a wired interface uses a 1-byte checksum, whereas the wireless interface uses a 2-byte checksum. In addition the protocol allows for an extension of device types and commands to be added later. Field 220 is the end-of-packet mark for the wired interface. The packet length and contents for other packet types are set by the command byte.

Figure 4:
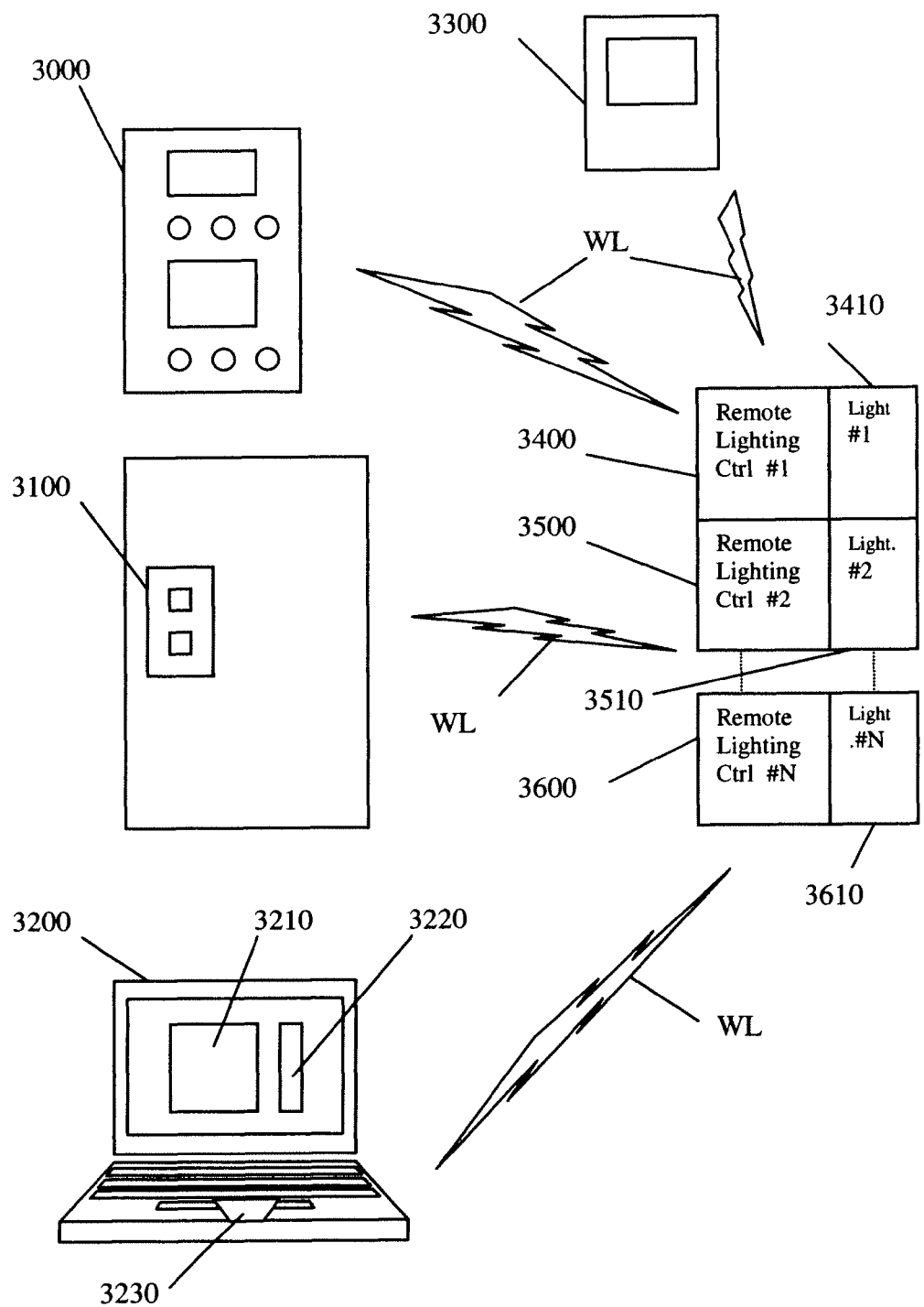
FIG. 4 is a depiction of various color control and intensity selection embodiments using a central controller with touch-pad sensors, personal computers or PDAs.

FIG. 4 is a depiction of various color control and intensity selection embodiments using central controller having touchpad sensors, personal computers or PDAs/smart phones. Touchpad color selection and intensity selection can be integrated into a number of central control devices not limited to the following:

A handheld remote control unit 3000
A wall mounted control unit 3100 similar in function to handheld remote control unit 3000;
Various type of PDAs or smart phones 3300 (i.e. Blackberry®, Apple iPhone®, etc.);
A general purpose or laptop computer 3200.

All of the methods would communicate to remote color controllers via a wireless links WL or a hard-wired connection (not shown) via the aforementioned packet description (Ref. FIG. 3). Remote control units 3400, 3500, 3600 would control respective lights #1 3410, #2 3510, through light #N 3610 within a zone. Wireless link WL would contain packet data having information such as commands, addresses, HSV/HSI, fade time, checksum, and special flag bits. The communication interface would also allow the main controller to query information from each of the remote lighting controllers 3400, 3500, 3600 such as color set etc. A plurality of zones (only one shown) and groups within zones are controlled by an individual central control unit.

Figure 4A:
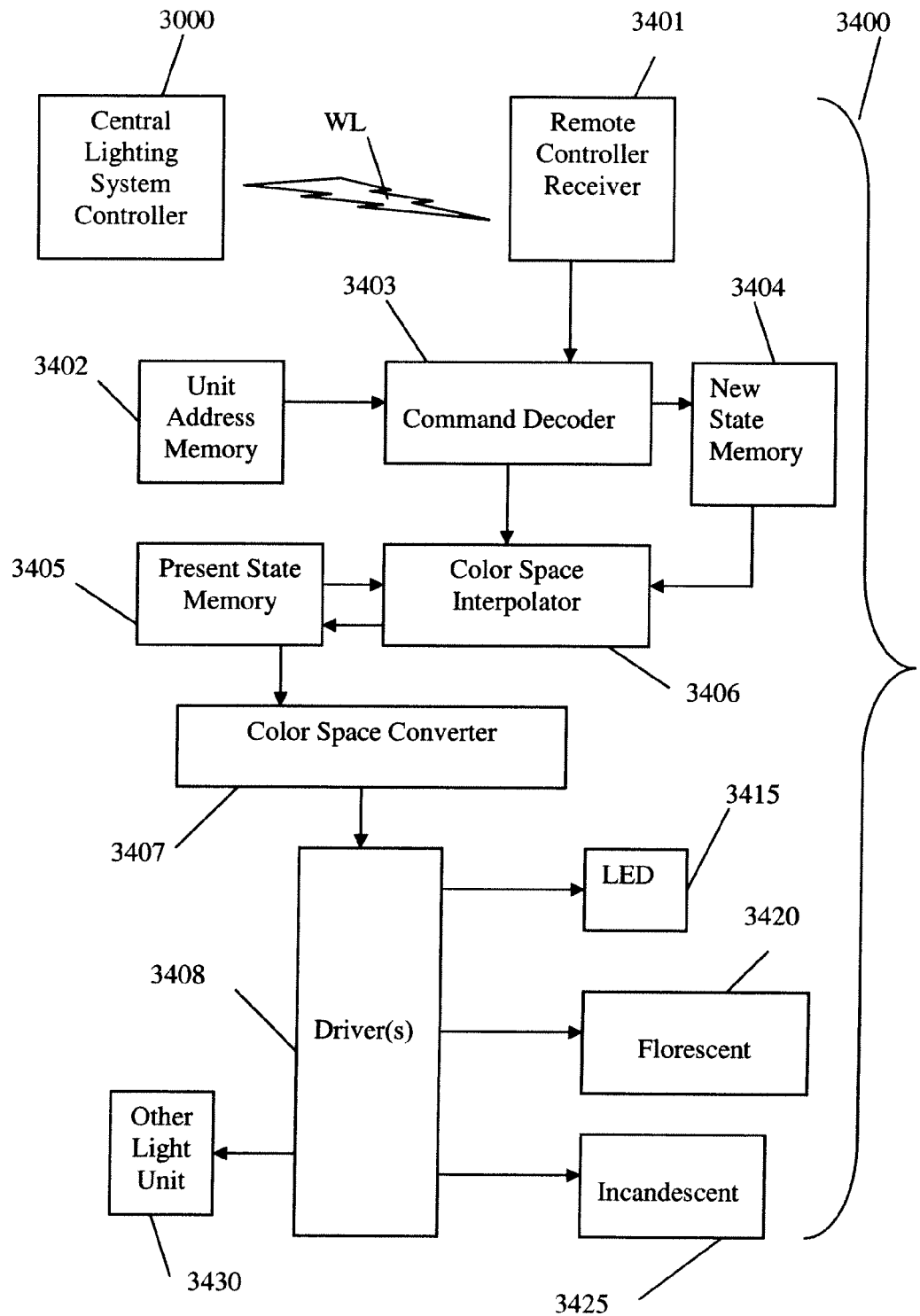
FIG. 4A is a schematic representation of a central lighting system controller and a remote lighting controller (Light Fixture Controller).

FIG. 4A is a schematic representation of central lighting system controller 3000 and a remote lighting controller 3400 (Light Fixture Controller). Central lighting system controller 3000 sends packet data to remote lighting controller 3400 via wireless link WL. Remote lighting controller receiver 3401 receives packet data and command decoder 3403 determines if the address sent via the packet is its respective address stored in unit address memory 3402. Unit address memory 3402 is pre-programmed to contain the remote controller zone, unit and group(s) respective addresses. If the address is valid, command decoder 3403 then interprets the command within the packet. It stores the new HSV state in new state memory 3404. Color space interpolator 3406 checks the present state from present state memory 3405, then updates the present state memory 3405 to match the with any new state data thereby implementing a fade from one color to another. Color space converter 3407 constantly monitors present state memory 3405 and if a change is detected from a previous color space to a new color state, it will convert the color scheme from HSV to any device-independent color scheme required by the specific lighting unit. For example a LED-based unit may require color information in the RGB format while a color-capable florescent unit may require information in the RGBA format.

Figure 5A:
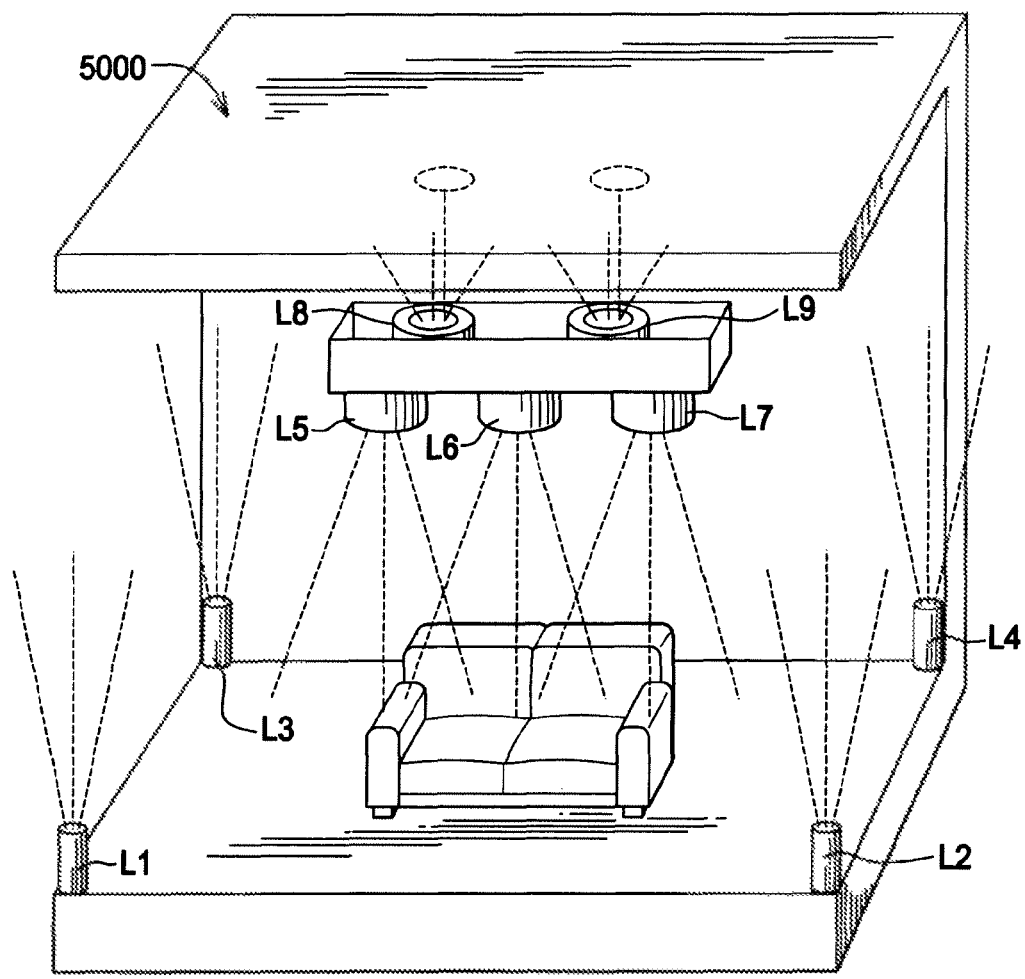
FIG. 5A is a front perspective view of an example installation containing a plurality of lighting groups with individual unit lights.

FIG. 5A is a front perspective view of an example room 5000 containing a plurality of lighting zones with individual unit lights. Shown are two separate zones with individual lights as follows:

Zone #1 contains four individual lights L1, L2, L3, L4;
Zone #2 contains five individual lights L5, L6, L7; L8, L9.
L5, L6, L7 are in Group #1 in Zone #2; and
L8, L9 are in Group #2 in Zone #2.

In this manner the lighting effects pointing to the ceiling would easily be changed independent of the lighting effects pointing down. It should be noted that there could be other group assignments in both zones. Each lighting controller recognizing its respective assigned zone address, group address and unit address for controlling its fixture.

Figure 5B:
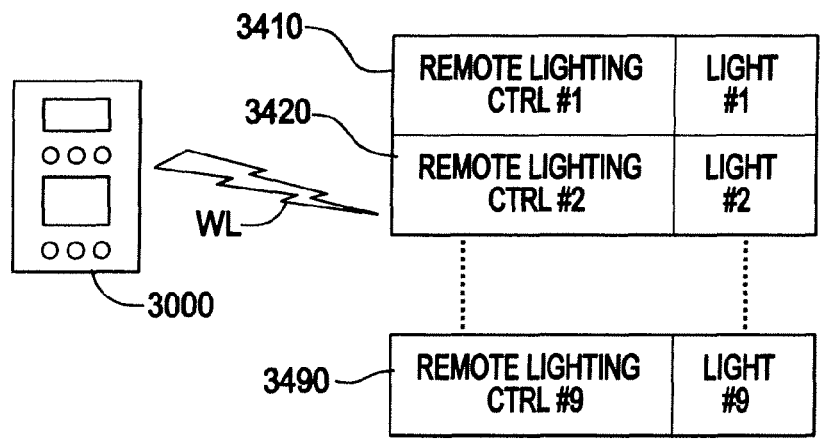
FIG. 5B is a diagram of a central remote control device sending control signals to remote controllers for the installation shown in FIG. 5A

FIG. 5B is a diagram of a central remote control device sending control signals to remote light controllers for the zone shown in FIG. 5A. Thus, handheld remote control unit 3000 would send commands over wireless link WL to the individual light controllers for control of entire zones, a particular group in a zone or individual lights within a zone. Each remote light controller would decode received protocol packets to see if their zone, group or light address were enclosed and respond accordingly. It should be noted that the central controller 3000 would not require knowledge of how to control lighting but only send a command as to what is required at which time the remote light controllers would act accordingly.

Figure 6:
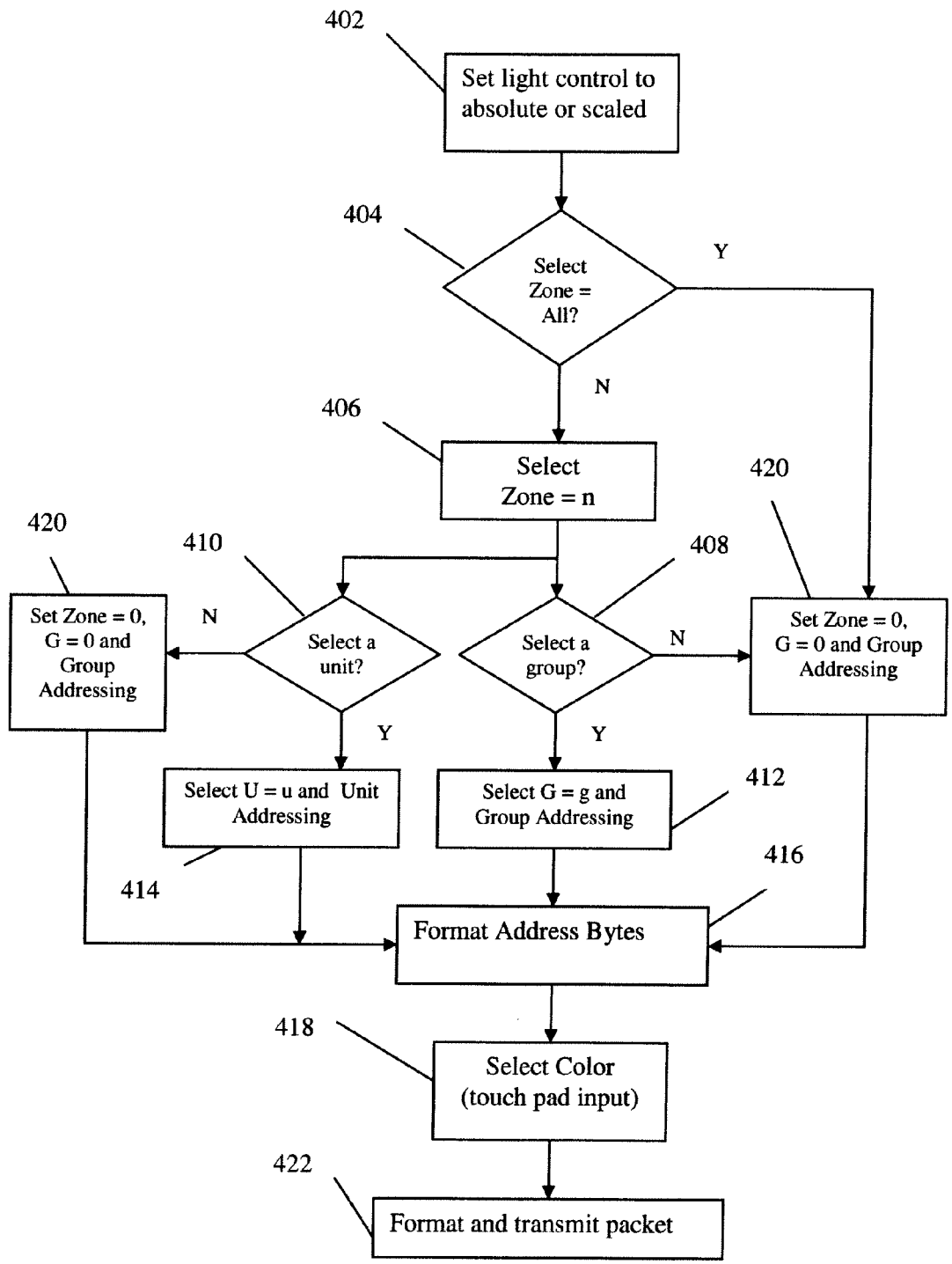
FIG. 6 is a flow chart of the packet color and address selection under manual control.

FIG. 6 is a flow chart of the packet color and address selection under manual control. First the user sets light control to absolute or scaled mode, step 402. The software assumes the initial address type is "all" meaning that all light fixtures will be controlled simultaneously. If the user leaves the default "all" addressing mode in step 404, then, in step 420 Zone and Group values are set to zero and the address type to Group. If the user changes the Zone to a specific zone number, then the selected Zone value 'n' is set in step 406. Next, simultaneously through the use of two buttons, in steps 408 and 410 the user can select either a specific group or unit address. If the user selects a specific group address then in step 412 the selected Group value 'g' is set and the address type is set to Group. If the user selects a specific unit address then in step 414 the selected Unit value 'u' is set and the address type is set to Unit. If neither a group or unit address is selected then in step 420 the Group value is set to zero and the address type is set to Group. In step 416 the address field for the packet is assembled based on the address type. Group address type generates a 3-byte address consisting of the Zone and Group addresses. Unit address type generates a 3-byte address consisting of the Zone and Unit addresses. In step 418 all aforementioned color space bytes are added per input formatted from the HSV space via the touchpad inputs. Finally in step 422 the packet is formatted and transmitted.

Although the present invention has been described with reference to preferred embodiments, numerous modifications and variations can be made and still the result will come within the scope of the invention. No limitation with respect to the specific embodiments disclosed herein is intended or should be inferred. Each apparatus embodiment described herein has numerous equivalents.

I claim:

1. A lighting control system comprising:
a remote lighting controller associated with a light such that a color state of the light is controlled independently by signals from the remote lighting controller;
said remote lighting controller having a data packet receiver and an assigned address;
a central lighting system controller having a data packet generator for sending data packets to the remote lighting controller in a send and forget mode;
said data packet having fields for remote lighting controller address and color state; and
wherein the remote lighting controller independently maintains its associated light at a preselected state until a new data packet is received.

2. The apparatus of claim 1, wherein the data packet generator further comprises a wired connection to the remote lighting controller.

3. The apparatus as claimed in claim 2, wherein said data packet further comprises a field for a start of packet and a field for an end of packet for use when a hard wire connects the control lighting system controller to the remote lighting controller.

4. The apparatus as claimed in claim 1, wherein the data packet generator further comprises a wireless connection to the remote lighting controller.

5. The apparatus as claimed in claim 1, wherein said data packet further comprises a field for a command type to distinguish unit versus group commands.

6. The apparatus as claimed in claim 1, wherein the address field further comprises identity bytes for a zone, and/or a group, and/or an individual unit address and/or a wildcard code designating all zones and/or groups and/or units.

7. The apparatus as claimed in claim 1, wherein said data packet color state further comprises a field for a hue selection.

8. The apparatus of claim 7, wherein said data packet color state further comprises a field for saturation selection.

9. The apparatus of claim 8, wherein said data packet further comprises a flag field to order a change either in the hue and/or saturation of the present state.

10. The apparatus as claimed in claim 1, wherein said data packet color state further comprises a field for a saturation selection.

11. The apparatus of claim 10, wherein said data packet color state further comprises a field for intensity selection.

12. The apparatus as claimed in claim 11, wherein said data packet further comprises a flag field to order a change either in the hue and/or saturation and/or intensity of the present state.

13. The apparatus of as claimed in claim 1, wherein said data packet color state further comprises a field for an intensity selection.

14. The apparatus as claimed in claim 1, wherein said data packet further comprises a field for a fade time from a present state to a newly commanded state.

15. The apparatus as claimed in claim 1, wherein said data packet further comprises a checksum field for data integrity.

16. The apparatus as claimed in claim 1, wherein the remote lighting controller further comprises a pulse width modulation with steps consisting of:
dividing an 8-bit color byte by two with a resulting value N being seven bits plus a 1-bit fraction;
using the resulting N (7-bit value) for even periods, for odd periods using the resulting N+1 fractional in the next sequential period of pulses; and
using the above results to control the pulse width modulation thereby reducing controller computational load.

17. The apparatus as claimed in claim 16, wherein a human eye will average the two (even and odd) period pulses (referred to as temporal averaging).

18. A method to control a color capable lighting system, the method comprising the steps of:

forming a plurality of color capable light units each having a remote controller with a data packet receiver and a unique address including a user selectable group identifier;

using the remote controller to control hue, saturation, intensity, fade time, dwell time of its color capable light unit based on data received in its data packet receiver;

programming a central lighting system controller to generate one or more data packets;

sending in a send and forget mode the generated data packets to all the data packet receivers in the remote controllers in the plurality of color capable light units; and maintaining each remote controller independently at its last/preselected state as received in its data packet receiver until a new data packet is received.

19. The method of claim 18 further comprising the step of forming the data packet to have a field for a command byte to distinguish a unit versus a group command.

20. The method as claimed in claim 18, further comprising the step of forming the data packet to have an address field.

21. The method as claimed in claim 18, further comprising the step of forming the data packet to have addresses for a zone, and/or a group, and/or an individual unit.

22. The method as claimed in claim 18, further comprising the step of forming the data packet to have a field for at least one of the variables of hue, saturation, intensity and fade time.

23. The method as claimed in claim 18, further comprising the step of forming the data packet to have a flag field indicating an instruction to change the state of either the hue, and/or the saturation, and/or the intensity of its present state.

24. A lighting control system comprising:

a remote lighting controller associated with a light such that a color state of the light is controlled independently by signals from the remote lighting controller;

said remote lighting controller having a data packet receiver and an assigned address;

a central lighting system controller having a data packet generator for sending date packets to the remote lighting controller in a send and forget mode; and said data packet having fields for remote lighting controller address and color state.

\* \* \* \* \*